(12) United States Patent
Gutta et al.

(10) Patent No.: US 6,851,090 B1
(45) Date of Patent: Feb. 1, 2005

(54) METHOD AND APPARATUS FOR DISPLAYING PROGRAM RECOMMENDATIONS WITH INDICATION OF STRENGTH OF CONTRIBUTION OF SIGNIFICANT ATTRIBUTES

(75) Inventors: Srinivas Gutta, Buchanan, NY (US); J. David Schaffer, Wappingers Falls, NY (US); Kwok Pun Lee, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 394 days.

(21) Appl. No.: 09/699,608

(22) Filed: Oct. 30, 2000

(51) Int. Cl.[7] .............................................. G06F 15/00
(52) U.S. Cl. .................................. 715/716; 715/763
(58) Field of Search .............................. 345/719, 720, 345/721; 725/39, 46

(56) References Cited

U.S. PATENT DOCUMENTS

| | | |
|---|---|---|
| 5,886,698 A | 3/1999 | Sciammarella et al. |
| 5,946,678 A | 8/1999 | Aalbersberg .................. 707/3 |
| 5,982,369 A | 11/1999 | Sciammarella et al. |
| 6,005,597 A * | 12/1999 | Barrett et al. ................ 725/46 |
| 6,151,059 A * | 11/2000 | Schein et al. ................ 725/37 |
| 6,163,316 A * | 12/2000 | Killian ....................... 345/721 |
| 6,177,931 B1 * | 1/2001 | Alexander et al. ............ 725/46 |
| 6,518,986 B1 * | 2/2003 | Mugura ....................... 345/810 |
| 6,519,009 B1 * | 2/2003 | Hanaya et al. ................ 348/564 |
| 6,608,633 B1 * | 8/2003 | Sciammarella et al. ..... 345/700 |

FOREIGN PATENT DOCUMENTS

| | | |
|---|---|---|
| EP | 0854645 A3 | 7/1998 |
| EP | 0854645 A2 | 7/1998 |
| WO | WO9856176 | 12/1998 |
| WO | WO9945701 | 9/1999 |

* cited by examiner

*Primary Examiner*—Cao Kevin Nguyen
(74) *Attorney, Agent, or Firm*—Gregory L. Thorne

(57) ABSTRACT

A method and apparatus are disclosed for displaying available television programs with an indication of the strength of the contribution of one or more program attributes or features to the overall recommendation score assigned by a program recommender. The program and corresponding indication of the strength of the contribution of one or more program attributes can be presented to the user, for example, using grids listing the available television programs by time and date, channel and title. The overall recommendation scores or component scores associated with each program are also displayed to the user. The overall recommendation scores or component scores can be displayed with each program directly or can be mapped onto a color spectrum or another visual cue, such as a variable size-of-text, rate of blinking or bar height. The visual cues are then applied to each program in the program grid in accordance with the present invention.

23 Claims, 9 Drawing Sheets

ELECTRONIC PROGRAM GUIDE - 600
(SIZE OF TEXT)

| EPG FOR THURSDAY, NOV. 18, 1999 FROM 8 P.M. UNTIL 11 P.M. | | | | | |
|---|---|---|---|---|---|
| | 8:00 | 8:30 | 9:00 | 9:30 | 10:00 10:30 |
| CH 1 | LUCY -- ⇒ <YELLOW> SIGNIFICANT ATTRIBUTE: GENRE=COMEDY | AL'S FAMILY -- ⇑ <GREEN> SIGNIFICANT ATTRIBUTE: GENRE=SITCOM | | STAR VOYAGER -- ⇓ <RED> SIGNIFICANT ATTRIBUTE: STATION=CH1 | CH 1 NEWS -- ⇑ <LIGHT GREEN> SIGNIFICANT ATTRIBUTE: TIME > 10:00 P.M. |
| CH 2 | | BASEBALL TODAY -- ⇓ <RED> SIGNIFICANT ATTRIBUTE: TIME>4:00 P.M. & TITLE=BASEBALL | | INSIDE SPORTS -- ⇓ <DARK RED> SIGNIFICANT ATTRIBUTE:STATION=CH2 & TIME > 6:00 P.M. | HOCKEY ⇓ <DARK RED> SIGNIFICANT ATTRIBUTE: STATION=CH2 & TIME > 6:00 P.M. |
| CH 3 | TONIGHT -- ⇒ <YELLOW> SIGNIFICANT ATTRIBUTE: GENRE=TALK SHOW | FAMILY TIME -- ⇓ <RED> SIGNIFICANT ATTRIBUTE: GENRE=DRAMA | YOUR HOUSE -- ⇑ <DARK GREEN> SIGNIFICANT ATTRIBUTE: TITLE | EVENING NEWS -- ⇑ <LIGHT GREEN> SIGNIFICANT ATTRIBUTE: ACTOR=TOM JENNINGS | HOSPITAL DRAMA ⇑ <DARK GREEN> SIGNIFICANT ATTRIBUTE: GENRE=DRAMA |
| ... | | | | | |
| CH 99 | | WORLD NEWS -- ⇑ <LIGHT GREEN> SIGNIFICANT ATTRIBUTE: TITLE | LOCAL NEWS - ⇑ <LIGHT GREEN> SIGNIFICANT ATTRIBUTE: GENRE=NEWS | | NEWSSTAND -- ⇑ <LIGHT GREEN> SIGNIFICANT ATTRIBUTE: STATION=CH99 & TIME>8:00 P.M. |

PROGRAM DATABASE
200

| | DATE/TIME 240 | CHANNEL 245 | TITLE 250 | GENRE 255 | ... | RECOMMENDER SCORE 270 |
|---|---|---|---|---|---|---|
| 205 | 11/18/99 -- 8:00 P.M. | CH1 | LUCY | COMEDY | | 55 |
| 210 | 11/18/99 -- 8:30 P.M. | CH1 | AL'S FAMILY | SITCOM | | 78 |
| | ... | | | | | |
| 220 | 11/18/99 -- 9:00 P.M. | CH3 | YOUR HOUSE | DRAMA | | 96 |

FIG. 2

USER PROFILE
400

| | RULE 450 | SCORE 455 |
|---|---|---|
| 405 | TITLE = { YOUR HOUSE, WORLD NEWS, MANNEQUIN, RUDY, DESIGNING, GOLDEN} | 100.0% |
| 406 | STATION_CALL_SIGN = WNBX & TITLE = SAT NIGHT | 100.0% |
| 407 | STATION_CALL_SIGN = WCBX & TITLE = 48 HOURS | 100.0% |
| 408 | STATION_CALL_SIGN = WNBX & TIME > 6:30 PM | 98.2% |
| 409 | STATION_CALL_SIGN = WABX & TIME > 7:00 PM | 92.6% |
| 410 | STATION_CALL_SIGN = WNYX & TIME >= 7:30 PM | 88.2% |
| 411 | STATION_CALL_SIGN = WPIQ & TIME > 9:30 AM | 86.7% |
| 412 | STATION_CALL_SIGN = HBC & TIME > 9:30 AM | 79.4% |
| 413 | ACTORS1 = JOHN SMITH | 100.0% |
| 414 | GENRE2 = ANIMALS | 99.0% |
| 415 | TIME >= 4:00 PM & TITLE = BASEBALL | 99.0% |
| 416 | STATION_CALL_SIGN = TRI | 20.6% |
| 417 | STATION_CALL_SIGN = US1 | 24.2% |
| 418 | STATION_CALL_SIGN = VCF | 29.3% |
| 419 | STATION_CALL_SIGN = WGNDIG | 37.0% |
| 420 | TIME <= 9:30 AM | 2.0% |
| 421 | NEW = Y | 82.0% |
| 422 | DIALOG_RATING = N & NEW = N & TIME <= 6:30 PM | 79.4% |
| 423 | DEFAULT = ??? | 0% |

FIG. 4

ELECTRONIC PROGRAM GUIDE - 600
(WITH SCORE AND INDICATION OF CONTRIBUTING ATTRIBUTE(S))

EPG FOR THURSDAY, NOV. 18, 1999 FROM 8 P.M. UNTIL 11 P.M.

| | 8:00 | 8:30 | 9:00 | 9:30 | 10:00 | 10:30 |
|---|---|---|---|---|---|---|
| CH 1 | LUCY <SCORE=55> SIGNIFICANT ATTRIBUTE: GENRE=COMEDY | AL'S FAMILY <SCORE=78> SIGNIFICANT ATTRIBUTE: GENRE=SITCOM | | STAR VOYAGER <SCORE=23> SIGNIFICANT ATTRIBUTE: STATION=CH1 | CH 1 NEWS <SCORE=62> SIGNIFICANT ATTRIBUTE: TIME > 10:00 P.M. | |
| CH 2 | BASEBALL TODAY <SCORE=99> SIGNIFICANT ATTRIBUTE: TIME >4:00 P.M. & TITLE=BASEBALL | | INSIDE SPORTS <SCORE=14> SIGNIFICANT ATTRIBUTE: STATION=CH2 & TIME > 6:00 P.M. | | HOCKEY <SCORE=10> SIGNIFICANT ATTRIBUTE: STATION=CH2 & TIME > 6:00 P.M. | |
| CH 3 | TONIGHT <SCORE=52> SIGNIFICANT ATTRIBUTE: GENRE=TALK SHOW. | FAMILY TIME <SCORE=30> SIGNIFICANT ATTRIBUTE: GENRE=DRAMA | YOUR HOUSE <SCORE=100> SIGNIFICANT ATTRIBUTE: TITLE | EVENING NEWS <SCORE=69> SIGNIFICANT ATTRIBUTE: ACTOR=TOM JENNINGS | HOSPITAL DARAMA <SCORE=88> SIGNIFICANT ATTRIBUTE: GENRE=DRAMA | |
| ... | | | | | | |
| CH 99 | WORLD NEWS <SCORE=100> SIGNIFICANT ATTRIBUTE: TITLE | | LOCAL NEWS <SCORE=60> SIGNIFICANT ATTRIBUTE: GENRE=NEWS | | NEWSSTAND <SCORE=65> SIGNIFICANT ATTRIBUTE: STATION=CH99 & TIME>8:00 PM | |

FIG. 6A

ELECTRONIC PROGRAM GUIDE - 600
(COLOR CODED)

EPG FOR THURSDAY, NOV. 18, 1999 FROM 8 P.M. UNTIL 11 P.M.

| | 8:00 | 8:30 | 9:00 | 9:30 | 10:00 | 10:30 |
|---|---|---|---|---|---|---|
| CH 1 | LUCY <YELLOW> SIGNIFICANT ATTRIBUTE: GENRE=COMEDY | AL'S FAMILY <GREEN> SIGNIFICANT ATTRIBUTE: GENRE=SITCOM | | STAR VOYAGER <RED> SIGNIFICANT ATTRIBUTE: STATION=CH1 | CH 1 NEWS <LIGHT GREEN> SIGNIFICANT ATTRIBUTE: TIME > 10:00 PM | |
| CH 2 | BASEBALL TODAY <RED> SIGNIFICANT ATTRIBUTE: TIME>4:00 P.M. & TITLE=BASEBALL | | INSIDE SPORTS <DARK RED> SIGNIFICANT ATTRIBUTE: STATION=CH2 & TIME > 6:00 P.M. | | HOCKEY <DARK RED> SIGNIFICANT ATTRIBUTE: STATION=CH2 & TIME > 6:00 P.M. | |
| CH 3 | TONIGHT <YELLOW> SIGNIFICANT ATTRIBUTE: GENRE=TALK SHOW. | FAMILY TIME <RED> SIGNIFICANT ATTRIBUTE: GENRE=DRAMA | YOUR HOUSE <DARK GREEN> SIGNIFICANT ATTRIBUTE: TITLE | EVENING NEWS <LIGHT GREEN> SIGNIFICANT ATTRIBUTE: ACTOR=TOM JENNINGS | HOSPITAL DARAMA <DARK GREEN> SIGNIFICANT ATTRIBUTE: GENRE=DRAMA | |
| ○ ○ ○ | | | | | | |
| CH 99 | WORLD NEWS <LIGHT GREEN> SIGNIFICANT ATTRIBUTE: TITLE | | LOCAL NEWS <LIGHT GREEN> SIGNIFICANT ATTRIBUTE: GENRE=NEWS | | NEWSSTAND <LIGHT GREEN> SIGNIFICANT ATTRIBUTE: STATION=CH99 & TIME>8:00 P.M. | |

FIG. 6B

ELECTRONIC PROGRAM GUIDE - 600
(SIZE OF TEXT)

EPG FOR THURSDAY, NOV. 18, 1999 FROM 8 P.M. UNTIL 11 P.M.

| | 8:00 | 8:30 | 9:00 | 9:30 | 10:00 | 10:30 |
|---|---|---|---|---|---|---|
| CH 1 | LUCY -- ⇒ <YELLOW> SIGNIFICANT ATTRIBUTE: GENRE=COMEDY | AL'S FAMILY -- ⇑ <GREEN> SIGNIFICANT ATTRIBUTE: GENRE=SITCOM | | STAR VOYAGER -- ⇓ <RED> SIGNIFICANT ATTRIBUTE: STATION=CH1 | CH 1 NEWS -- ⇑ <LIGHT GREEN> SIGNIFICANT ATTRIBUTE: TIME > 10:00 P.M. | |
| CH 2 | BASEBALL TODAY -- ⇓ <RED> SIGNIFICANT ATTRIBUTE: TIME>4:00 P.M. & TITLE=BASEBALL | | INSIDE SPORTS -- ⇓ <DARK RED> SIGNIFICANT ATTRIBUTE:STATION=CH2 & TIME > 6:00 P.M. | | HOCKEY -- ⇓ <DARK RED> SIGNIFICANT ATTRIBUTE: STATION=CH2 & TIME > 6:00 P.M. | |
| CH 3 | TONIGHT -- ⇒ <YELLOW> SIGNIFICANT ATTRIBUTE: GENRE=TALK SHOW | FAMILY TIME -- ⇑ <RED> SIGNIFICANT ATTRIBUTE: GENRE=DRAMA | YOUR HOUSE -- ⇑ <DARK GREEN> SIGNIFICANT ATTRIBUTE: TITLE | EVENING NEWS -- ⇑ <LIGHT GREEN> SIGNIFICANT ATTRIBUTE: ACTOR=TOM JENNINGS | HOSPITAL DRAMA -- ⇑ <DARK GREEN> SIGNIFICANT ATTRIBUTE: GENRE=DRAMA | |
| ... | | | | | | |
| CH 99 | WORLD NEWS -- ⇑ <LIGHT GREEN> SIGNIFICANT ATTRIBUTE: TITLE | | LOCAL NEWS -- ⇑ <LIGHT GREEN> SIGNIFICANT ATTRIBUTE: GENRE=NEWS | | NEWSSTAND -- ⇑ <LIGHT GREEN> SIGNIFICANT ATTRIBUTE: STATION=CH99 & TIME>8:00 P.M. | |

FIG. 6C

| RECOMMENDER SCORE | COLOR |
|---|---|
| 0-15 | DARK RED |
| 16-30 | RED |
| 31-45 | LIGHT RED |
| 46-55 | YELLOW |
| 56-70 | LIGHT GREEN |
| 71-85 | GREEN |
| 86-100 | DARK GREEN |

METHOD AND APPARATUS FOR DISPLAYING PROGRAM RECOMMENDATIONS WITH INDICATION OF STRENGTH OF CONTRIBUTION OF SIGNIFICANT ATTRIBUTES

FIELD OF THE INVENTION

The present invention relates to television program recommenders, and more particularly, to a method and apparatus for displaying television program recommendations.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGs, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

Thus, such tools for recommending television programming provide selections of programs that a viewer might like. Even with the aid of such program recommenders, however, it is still difficult for a viewer to identify programs of interest from among all the options. In particular, for a given recommended program, such program recommenders do not indicate the program features that most contributed to the recommendation score. A need therefore exists for a method and apparatus for displaying television program recommendations in a more efficient manner. A further need exists for a television program recommender that provides an indication of the strength of the contribution of one or more program attributes or features to the program recommendation score.

SUMMARY OF THE INVENTION

Generally, a method and apparatus are disclosed for displaying available television programs with an indication of the strength of the contribution of one or more program attributes or features to the overall recommendation score assigned by a program recommender. The program and corresponding indication of the strength of the contribution of one or more program attributes can be presented to the user, for example, using grids listing the available television programs by time and date, channel and title.

According to one aspect of the invention, the overall recommendation scores or component scores associated with each program are also displayed to the user. The overall recommendation scores or component scores can be displayed with each program directly or can be mapped onto a color spectrum or another visual cue, such as a variable size-of-text, rate of blinking or bar height, that permits the user to quickly locate programs of interest. The visual cues are then applied to each program in the program grid in accordance with the present invention.

A more complete understanding of the present invention, as well as further features and advantages of the present invention, will be obtained by reference to the following detailed description and drawings.

BRIEF DESCRIPTION OF THE DRAWINGS

FIG. 2 illustrates a sample table from the program database of FIG. 1;

FIG. 4 is a user profile based on the hierarchical decision tree of FIG. 3;

FIG. 6A is a sample table from the electronic program guide in accordance with one embodiment of the invention;

FIG. 6B is a sample table from the electronic program guide in accordance with a second embodiment of the invention;

FIG. 6C is a sample table from the electronic program guide in accordance with a third embodiment of the invention;

DETAILED DESCRIPTION

Figure 1:
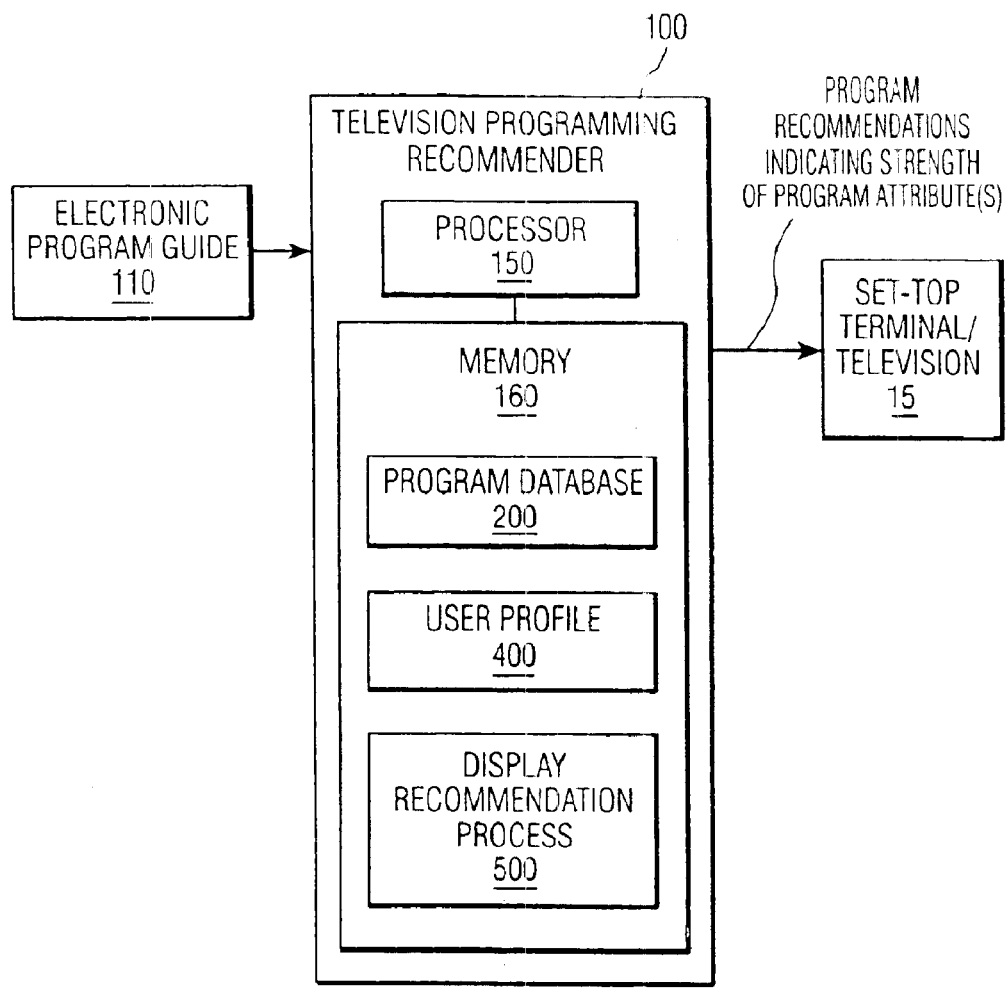
FIG. 1 illustrates a television programming recommender in accordance with the present invention.

FIG. 1 illustrates a television programming recommender 100 in accordance with the present invention. As shown in FIG. 1, the television programming recommender 100 evaluates each of the programs in an electronic programming guide (EPG) 110 to identify programs of interest to a particular user. The set of recommended programs can be presented to the user using a set-top terminal/television 15, for example, using well known on-screen presentation techniques.

According to one feature of the present invention, the available programs are displayed together with an indication of (i) the overall recommendation score, (ii) the strength of the contribution of one or more program attributes or features to the overall recommendation score, or (iii) a combination of the foregoing. In other words, the present invention optionally indicates the most significant feature(s) that actually contributed to the recommendation of a given program.

The programs can be presented, for example, using grids listing the available television programs by time and date, channel and title. The strength of the contribution of one or more program attributes to the overall program recommendation score is also presented in the program grid. For example, a predefined number of program attributes having the highest component score can be presented for each program. In further variations, the contribution of one or more program attributes to the program recommendation score can be mapped onto a color spectrum or another visual cue, such as size-of-text or rate of blinking, that permits the user to quickly locate programs having attributes of interest. In yet another variation, the strength of the contribution of one or more program attributes to the program recommendation score can be mapped onto a variable brightness scale (gray scale). These visual cues can then be applied to each program in the program grid. It is noted that the overall program recommendation score itself can also be mapped to such visual cues and presented in the program grid.

For example, in an implementation where the television programming recommender 100 assigns a score between 0 and 100 to each program, the overall program recommendation score as well as individual component scores for each program attribute can be mapped to a color spectrum or a size-of-text visual cue in the following manner:

| RECOMMENDER SCORE | COLOR | FONT SIZE/ THUMBS UP-DOWN |
|---|---|---|
| 0–15 | DARK RED | 10/⇓ |
| 16–30 | RED | 10/⇓ |
| 31–45 | LIGHT RED | 10/⇓ |
| 46–55 | YELLOW | 12/⇒ |
| 56–70 | LIGHT GREEN | 14/⇑ |
| 71–85 | GREEN | 16/⇑ |
| 86–100 | DARK GREEN | 18/⇑ |

In a further variation of the present invention, the television channels can be sorted in the program grid according to a normalized recommendation score for the time period being examined. For example, for a given half-hour time interval, the program grid can be sorted directly by recommendation score, such that programs with the highest score appear on the top of the program grid listing. Likewise, for time intervals larger than a half hour, a normalized score can be assigned to each channel for the time period of interest and the program grid can then be sorted by the normalized score, such that channels with the highest normalized score for the time period of interest appear on the top of the program grid listing.

As shown in FIG. 1, the television programming recommender 100 contains a program database 200 a user profile 400, discussed further below in conjunction with FIGS. 2 and 4, respectively, and a display recommendation process 500, discussed further below in conjunction with FIG. 5. Generally, the program database 200 records information for each program that is available in a given time interval. The information in the program database 200 may be obtained, for example, from the electronic program guide 110. The illustrative user profile 400 contains a set of rules indicating the viewing preferences of the user that have been learned from the user's viewing history. The display recommendation process 500 displays the available programs together with an indication of the strength of the contribution of one or more program attributes to the overall program recommendation score.

The television program recommender 100 may be embodied as any computing device, such as a personal computer or workstation, containing a processor 150, such as a central processing unit (CPU), and memory 160, such as RAM and ROM. In addition, the television programming recommender 100 may be embodied as any available television program recommender, such as the Tivo™ system, commercially available from Tivo, Inc., of Sunnyvale, Calif., or the television program recommenders described in United States patent application Ser. No. 09/466,406, filed Dec. 17, 1999, entitled "Method and Apparatus for Recommending Television Programming Using Decision Trees," and U.S. patent application Ser. No. 09/498,271, filed Feb. 4, 2000, entitled "Bayesian TV Show Recommender," or any combination thereof, as modified herein to carry out the features and functions of the present invention.

FIG. 2 is a sample table from the program database 200 of FIG. 1 that records information for each program that is available in a given time interval. As shown in FIG. 2, the program database 200 contains a plurality of records, such as records 205 through 220, each associated with a given program. For each program, the program database 200 indicates the date/time and channel associated with the program in fields 240 and 245, respectively. In addition, the title and genre for each program are identified in fields 250 and 255. Additional well-known attributes (not shown), such as actors, duration, and description of the program, can also be included in the program database 200.

In addition, the program database 200 also optionally records an indication of the overall recommendation score assigned to each program by the television programming recommender 100 in field 270. In this manner, the numerical scores can be displayed to the user in the electronic program guide with each program directly or mapped onto a color spectrum or another visual cue that permits the user to quickly locate programs of interest.

Figure 3:
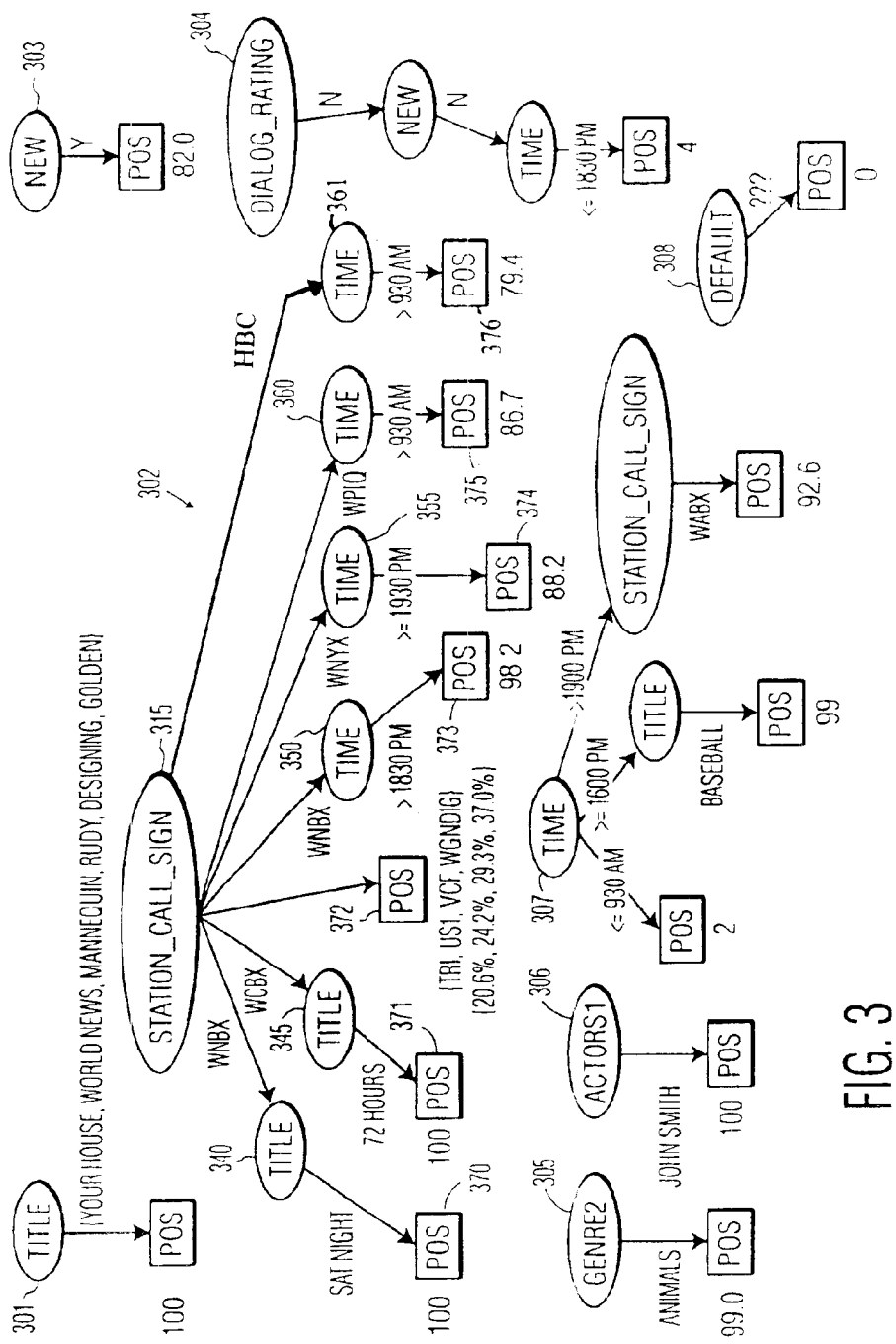
FIG. 3 illustrates a hierarchical decision tree that positions the various attributes of television programs in the tree based on a ranking of the entropy of each attribute.

For each positive and negative program example (i.e., programs watched and not watched by the user), a number of well-known attributes and corresponding attribute-value pairs are classified for the user, such as the time, date, duration, channel, rating, title and genre of a given program. As shown in FIG. 3, the various attributes are positioned in one or more hierarchical decision trees 301–308 based on a ranking of the entropy of each attribute. Generally, the higher an attribute is positioned along a given branch of the tree (corresponding to a rule) in the hierarchical decision tree 300, the more significant the attribute. Thus, when the component scores are presented for a given attribute in accordance with the present invention, they can optionally be presented in order of their appearance in the hierarchical tree, from the root node down to the leaf node.

The illustrative decision tree 302 includes a root node 315 and a number of sub-nodes, such as sub-nodes 340, 345, 350, 355, 360 and 361. Each node and sub-node in the decision tree 302 corresponds to a given attribute and each branch connecting two nodes corresponds to a specific attribute-value pair (or set of attribute value pairs). Each leaf node in the decision tree 302, such as the leaf nodes 370–376, corresponds to either a positive or negative recommendation for a program mounted at the corresponding leaf node. In addition, the corresponding score assigned to a program satisfying the rule is indicated adjacent to the leaf node 370–376.

For example, if a given program has a station_call_sign of WNBX and a title of "Saturday Night," the program will be classified under leaf node 370 as a positive example. Thereafter, if a given program in the test data has values meeting this criteria for these attributes the program will be a recommended program with a score of 100.00%.

The decision trees 301–308 can be built, for example, using a "top-down divide and conquer" approach. For a more detailed discussion of the generation of decision trees, see, for example, U.S. patent application Ser. No. 09/466,406, filed Dec. 17, 1999, entitled "Method and Apparatus for Recommending Television Programming Using Decision Trees," assigned to the assignee of the present invention and incorporated by reference herein. The decision trees 301–308 can thereafter be converted to rules and recorded in a user profile 400, shown in FIG. 4.

FIG. 4 is a sample table from the user profile 400, based on the hierarchical decision trees 301–308 of FIG. 3. The decision tree rules shown in the user profile 400 allow the introspective analysis of the behavior of the present invention. Generally, the decision tree rules shown in the user profile 400 are an ordered list. As shown in FIG. 4, the user profile 400 comprises a plurality of records, such as records 405–423, each associated with a different rule. For each rule identified in column 450, the user profile 400 indicates the corresponding score that is assigned to a program satisfying the rule in column 455. Thus, the user profile 400 is traversed until a matching rule is identified. Once a matching rule is identified, the corresponding recommendation score is applied to the matching program.

It is noted that an alternate implementation could allow a number of rules to be satisfied by a given program. Thus, in accordance with the present invention, the number of satisfied rules may be indicated, as well as the attribute-value pairs contributing to each rule.

In accordance with the present invention, discussed further below in conjunction with FIGS. 5 and 6A–6C, the attributes that contribute to the matching rule are optionally indicated, together with the overall program score in the program grid. For example, if a given program has a station_call_sign of WNBX and a title of "Saturday Night," the program will be classified under leaf node 370 as a positive example. In the program grid, the program recommendation score of 100.0% is indicated, together with an indication of the attribute-value pairs contributing to the score (station="WNBX" and title="Saturday Night").

Figure 5:
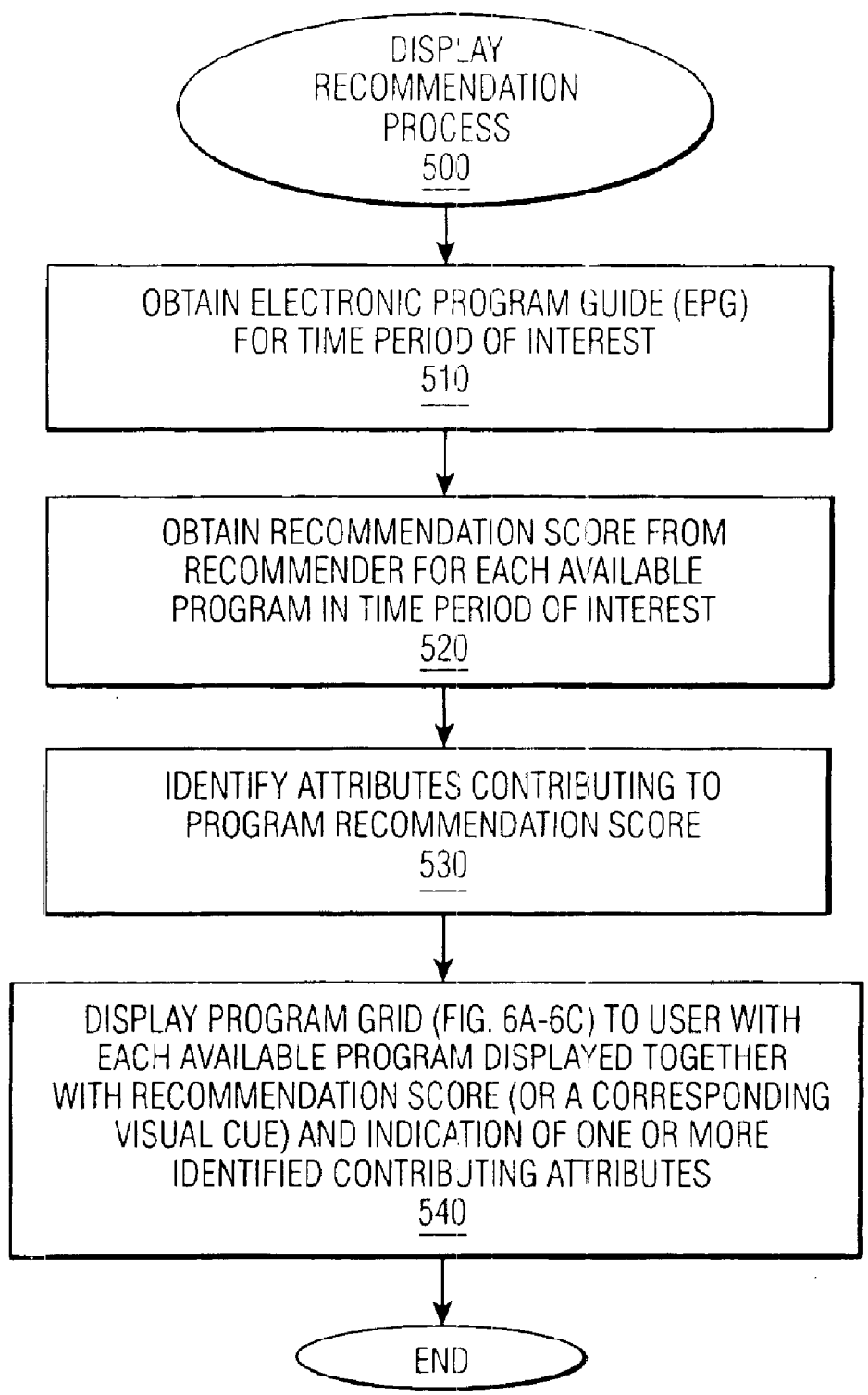
FIG. 5 is a flow chart describing an exemplary display recommendation process embodying principles of the present invention.

FIG. 5 is a flow chart describing an exemplary display recommendation process 500 embodying principles of the present invention. As shown in FIG. 5, the display recommendation process 500 initially obtains the electronic program guide (EPG) 110 during step 510 for the time period of interest. Thereafter, the display recommendation process 500 obtains the recommendation score from the recommender 100 for each available program in the time period of interest during step 520. The display recommendation process 500 then identifies one or more of the significant attributes contributing to the program recommendation score during step 530.

Finally, the display recommendation process 500 displays the modified program grid to the user during step 540 with each available program displayed together with the overall recommendation score (or a corresponding visual cue) and, optionally, an indication of the contribution of one or more of the significant attributes to the overall recommendation score. The user can thereafter interact with the modified program grid using known techniques, for example, to select programs, automatically record programs or to program warnings that will automatically notify the user when a particular program is being presented.

In one illustrative presentation format, the score ranges are divided up and mapped directly to colors, in the manner described above. For example, if a particular feature has a score of 95, and all values between 86 and 100 are assigned the color dark green, then the contributing attributes will be represented by a dark green bar. If the corresponding cell in the program grid is selected, then the attribute associated with the bar could appear in textual form or the bar could be always displayed in the corner of the cell and only the text would appear when the cell is selected. In a further variation, the value of the recommendation score or component scores would be used to set the height within a bar or the intensity of the color.

For example, if the user profile 400 for a particular user has a rule that assigns a score of 100.00 to any program with the title "World News," then any programs appearing in the program grid with the title "World News," should be assigned a score of 100. Furthermore, the cell in the program grid should indicate that the most significant feature contributing to the overall score is the title itself. In such a case, a color bar could be displayed using any of the visual cues discussed above.

FIG. 6A is a sample table from the electronic program guide 600 in accordance with a first embodiment of the invention. Specifically, the embodiment of FIG. 6A presents each program together with the overall recommendation score directly and an indication of the most significant contributing attribute. Thus, a user can review the electronic program guide 600 and quickly identify the programs having the highest score and the most desirable attribute.

Figures 7A, 7B:
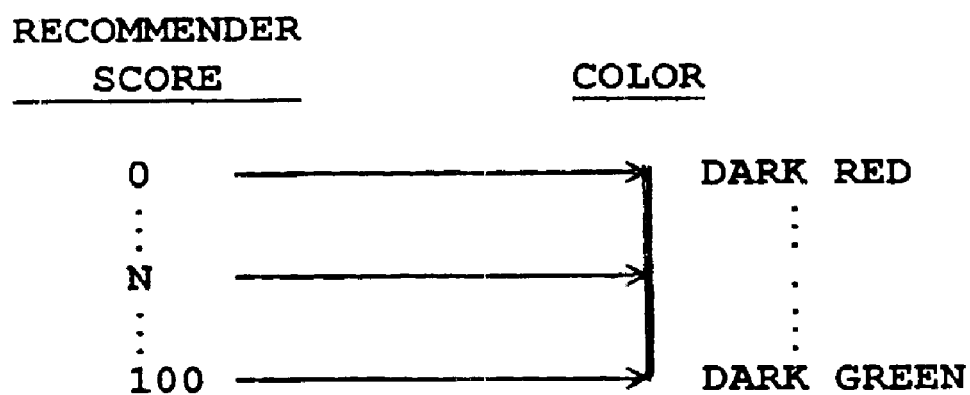
FIG. 7A is an exemplary representation of a discrete mapping in accordance with an embodiment of the invention.
FIG. 7B is an exemplary representation of mapping in a continuous fashion in accordance with an embodiment of the invention.

FIG. 6B is a sample table from the electronic program guide 600 in accordance with a second embodiment of the invention. Specifically, the embodiment of FIG. 6B presents each program together with a numerical mapping of the recommendation score onto a color scheme, in the manner described above. In addition, each cell provides an indication of the most significant attribute that contributes to the overall recommendation score. It is noted that for a color mapping implementation, a range of scores can be discretely mapped to a given color, as discussed above, or a score can be mapped to a color in a continuous fashion. FIG. 7A again shows such a discrete mapping of scores, while FIG. 7B represents scores being mapped in a continuous fashion. Thus, a user can review the electronic program guide 600 and quickly identify the programs with dark green, associated with the mostly strongly recommended programs.

FIG. 6C is a sample table from the electronic program guide 600 in accordance with a third embodiment of the invention. Specifically, the embodiment of FIG. 6C presents each program together with a numerical mapping of the recommendation score onto a size-of-text scheme, in the manner described above. In addition, each cell provides an indication of the most significant attribute that contributes to the overall recommendation score. Thus, a user can review the electronic program guide 600 and quickly identify the programs with a thumbs up symbol (⇑) and printed with the largest font.

The actual intensity or saturation values are computed using well-known algorithms in computer graphics. Although RGB (red, green, blue) values are required for the display hardware, it is generally easier to determine values according to the HSV (hue, saturation, value) model and then convert the result to a RGB representation. First, a hue value is selected corresponding to the color chosen for a given range of recommendation scores:

| Hue Value | Color | Score Range |
|---|---|---|
| 0 | Red | 90–100 |
| 0.160 | Yellow | 80–90 |
| 0.333 | Green | 70–80 |
| 0.6 | Blue | 60–70 |

Saturation is computed from n, the number of programs in the range. If n has a value greater than 10, n is replaced by 10. Then, the saturation value is the fraction n/10. Finally, the value is fixed at 1.0. This triple (hue, saturation, value) is then converted to (red, green, blue) according to a well-known algorithm. See, for example, "Fundamentals of Interactive Computer Graphics," by J. D. Foley and A. Van Dam, Addison-Wesley Publishing Company, ISBN 0-201-14468-9 (1982). It is to be understood that the embodiments and variations shown and described herein are merely illustrative of the principles of this invention and that various modifications may be implemented by those skilled in the art without departing from the scope and spirit of the invention.

What is claimed is:

1. A method for displaying available television programs, comprising the steps of:
   obtaining a list of available programs;
   obtaining a recommendation score for each of said available programs; and
   displaying said list of available programs to a user with an indication of one or more program attributes contributing to said recommendation score.

2. The method of claim 1, wherein said indication of one or more program attributes contributing to said recommendation score provides a component score of said one or more, program attributes.

3. The method of claim 1, wherein said indication of one or more program attributes contributing to said recommendation score indicates a most significant program attribute.

4. The method of claim 1, wherein said indication of one or more program attributes contributing to said recommendation score indicates a predefined number of most significant program attributes.

5. The method of claim 1, wherein said indication of one or more program attributes contributing to said recommendation score utilizes a color scheme.

6. The method of claim 5, wherein said color scheme discretely maps said score to a color.

7. The method of claim 5, wherein said color scheme continuously maps said score to a color.

8. The method of claim 1, wherein said indication of one or more program attributes contributing to said recommendation score utilizes a variable size-of-text scheme.

9. The method of claim 1, wherein said indication of one or more program attributes contributing to said recommendation score utilizes a variable rate-of-flicker scheme.

10. The method of claim 1, wherein said indication of one or more program attributes contributing to said recommendation score utilizes a variable brightness scheme.

11. The method of claim 1, wherein said indication of one or more program attributes contributing to said recommendation score utilizes a variable bar height.

12. A method for displaying available television programs, comprising the steps of:
    obtaining a list of available programs;
    obtaining a recommendation score for each of said available programs; and
    displaying said list of available programs to a user with a visual cue of one or more program attributes contributing to said recommendation score.

13. The method of claim 12, wherein said visual cue of one or more program attributes contributing to said recommendation score utilizes a color scheme.

14. The method of claim 13, wherein said color scheme discretely maps said score to a color.

15. The method of claim 13, wherein said color scheme continuously maps said score to a color.

16. The method of claim 12, wherein said visual cue of one or more program attributes contributing to said recommendation score utilizes a variable size-of-text scheme.

17. The method of claim 12, wherein said visual cue of one or more program attributes contributing to said recommendation score utilizes a variable rate-of-flicker scheme.

18. The method of claim 12, wherein said visual cue of one or more program attributes contributing to said recommendation score utilizes a variable brightness scheme.

19. The method of claim 12, wherein said visual cue of one or more program attributes contributing to said recommendation score utilizes a variable bar height.

20. A system for displaying available television programs, comprising:
    a memory for storing computer readable code; and
    a processor operatively coupled to said memory, said processor configured to:
    obtain a list of available programs;
    obtain a recommendation score for each of said available programs; and
    display said list of available programs to a user with an indication of one or more program attributes contributing to said recommendation score.

21. A system for displaying available television programs, comprising:
    a memory for storing computer readable code; and
    a processor operatively coupled to said memory, said processor configured to:
    obtain a list of available programs;
    obtain a recommendation score for each of said available programs; and
    display said list of available programs to a user with a visual cue of one or more program attributes contributing to said recommendation score.

22. An article of manufacture for displaying available television programs, comprising:
    a computer readable medium having computer readable code means embodied thereon, said computer readable code means comprising:
    a step to obtain a list of available programs;
    a step to obtain a recommendation score for each of said available programs; and
    a step to display said list of available programs to a user with an indication of one or more program attributes contributing to said recommendation score.

23. An article of manufacture for displaying available television programs, comprising:
    a computer readable medium having computer readable code means embodied thereon, said computer readable code means comprising:
    a step to obtain a list of available programs;
    a step to obtain a recommendation score for each of said available programs; and
    a step to display said list of available programs to a user with a visual cue of one or more program attributes contributing to said recommendation score.

* * * * *